United States Patent
Brassine et al.

(10) Patent No.: US 9,644,486 B2
(45) Date of Patent: May 9, 2017

(54) CO-INJECTED COMPOSITE SHELL FOR AN AXIAL TURBOMACHINE COMPRESSOR

(71) Applicant: TECHSPACE AERO S.A., Herstal (Milmort) (BE)

(72) Inventors: Christine Brassine, Nandrin (BE); Xavier Wery, Liege (BE)

(73) Assignee: Techspace Aero S.A. (BE)

(*) Notice: Subject to any disclaimer, the term of this patent is extended or adjusted under 35 U.S.C. 154(b) by 871 days.

(21) Appl. No.: 13/658,981

(22) Filed: Oct. 24, 2012

(65) Prior Publication Data

US 2013/0108427 A1 May 2, 2013

(30) Foreign Application Priority Data

Oct. 27, 2011 (EP) .................................. 11186969

(51) Int. Cl.
*F01D 9/04* (2006.01)
*B29C 45/16* (2006.01)
(Continued)

(52) U.S. Cl.
CPC .............. *F01D 9/042* (2013.01); *B29C 45/16* (2013.01); *F01D 11/122* (2013.01);
(Continued)

(58) Field of Classification Search
CPC ........ F01D 9/042; F01D 9/044; F01D 11/001; F01D 11/122; F01D 11/125;
(Continued)

(56) References Cited

U.S. PATENT DOCUMENTS 4,460,185 A * 7/1984 Grandey ........................ 277/415
4,655,682 A 4/1987 Kunz et al.
(Continued)

FOREIGN PATENT DOCUMENTS

DE 10259963 A1 7/2004
EP 1705341 A2 9/2006
(Continued)

OTHER PUBLICATIONS

English Translation of EP 2,075,414 A1 Description, EPO Patent Translate.*
(Continued)

*Primary Examiner* — Dwayne J White
*Assistant Examiner* — Adam W Brown
(74) *Attorney, Agent, or Firm* — Polster Lieder (57) ABSTRACT

A segmented composite shell for an axial turbomachine compressor, each segment formed of a first polymeric material and comprises at least one working surface formed of a second polymeric material co-injected with the first polymeric material. The working surface can be a contact surface with a blade, wherein the working surface has a lipped profile and is made of an elastomeric material. The working surface can be the inner surface for bonding an abradable material, wherein the material can be silicone to facilitate the bonding of the abradable material to the silicone base. The working surface can be a lateral face of the shell that contacts a mating fixed surface, wherein the material can comprise TEFLON®, i.e. Polytetrafluoroethylene (PTFE), so as to form a working surface with dry friction properties. Such features enable the shell to have additional technical features implemented directly during the injection moulding of the shell segments.

13 Claims, 4 Drawing Sheets

(51) Int. Cl.
  *F01D 11/12* (2006.01)
  *F04D 29/54* (2006.01)
  *F04D 29/02* (2006.01)

(52) U.S. Cl.
  CPC ......... *F04D 29/023* (2013.01); *F04D 29/542* (2013.01); *B29C 45/1635* (2013.01); *B29C 45/1676* (2013.01); *F05D 2230/20* (2013.01); *F05D 2300/43* (2013.01); *F05D 2300/432* (2013.01); *F05D 2300/437* (2013.01); *F05D 2300/603* (2013.01); *Y02T 50/672* (2013.01); *Y02T 50/673* (2013.01)

(58) Field of Classification Search
  CPC ................ F04D 29/023; F04D 29/542; F05D 2300/603; F05D 2230/20; F05D 2300/222; B29C 45/16; B29C 45/1635; B29C 45/1676; Y02T 50/673; Y02T 50/672
  See application file for complete search history.

(56) References Cited

U.S. PATENT DOCUMENTS 7,287,957 B2 * 10/2007 Jahns et al. ................ 415/173.7
2008/0047504 A1 * 2/2008 Benvenuto et al. ....... 123/41.49

FOREIGN PATENT DOCUMENTS

| EP | 1705341 | A3 |   | 9/2006 |
| --- | --- | --- | --- | --- |
| EP | 2075414 | A1 | * | 7/2009 |
| EP | 2196629 | A1 |   | 6/2010 |
| EP | 2202264 | A1 |   | 6/2010 |

OTHER PUBLICATIONS

Luxembourg Search Report from corresponding application EP 11186969.9 dated Mar. 29, 2012.

* cited by examiner

CO-INJECTED COMPOSITE SHELL FOR AN AXIAL TURBOMACHINE COMPRESSOR

CROSS-REFERENCE TO RELATED APPLICATIONS

This application claims the benefit, under 35 U.S.C. §119, of EP 11186969.9, filed Oct. 27, 2011, the disclosure of which is incorporated herein by reference in its entirety.

FIELD

The present teachings relate to the field of axial turbomachine stator shells or ferrules. Particularly, the present teachings relate to the field of segmented shells made of a composite material comprising, in particular, a polymer. More particularly, the present teachings relate to a segment of such a shell, to such a shell and to a segment manufacturing method.

BACKGROUND

The statements in this section merely provide background information related to the present disclosure and may not constitute prior art.

Patent EP 2196629 A1 discloses a segmented inner shell or ferrule of an axial turbomachine compressor. The shell has the particularity that the ends of the segments constituting the shell have profiles corresponding to the profiles of the blades so as to marry up with the blades at the joint between the segments during the assembly of the shell on the compressor. The connection between the blades and these profiles is provided by manual application of an elastomer. This is also the method used for connecting the blades and the apertures distributed along the segments and used to house the blades. This therefore requires time-consuming manual intervention during the assembly of the compressor. Once the shell is assembled, abradable material is sprayed onto the inner surface of the shell to provide a seal with the compressor rotor lip seals. Sanding the surface of the shell and the application of a primer is required in advance to ensure that the abradable material bonds satisfactorily to the shell. This is also time-consuming.

U.S. Pat. No. 4,655,682 discloses an inner shell of an axial turbomachine compressor. The shell is made of composite material and comprises a single ring and segments supported on the ring. Silicone is applied between the ends of the blades and the corresponding housings on the segments. As in the previous teaching, the operation of applying silicone manually is time-consuming. The ring is a laminated structure comprising layers of polyamide fibers impregnated with an epoxy resin. As in the previous teaching, sanding the surface of the ring, as well as the application of a primer, is required in advance to ensure a satisfactory bond between the abradable material and the ring.

SUMMARY

The invention aims to provide a solution to at least one of the disadvantages described above. More particularly, the invention aims to provide a turbomachine stator shell made of a non-metallic material which is economical and easy to assemble.

The invention relates to a bladed stator shell segment of an axial turbomachine, comprising: a body with an arcuate cross section and made of a mainly polymeric material; at least one working surface of the body is intended to mate and/or cooperate directly or indirectly with an element of the turbomachine; wherein the working surface or at least one working surface is made of a second polymeric material co-injected with the first material.

The first material can be thermoplastic or thermosetting. The first material can be comprised of polyethylenimine (PEI) or polyamide-imide (PAI). The second material can be comprised of thermoplastic or thermosetting. The second material can comprise silicone and/or TEFLON®, i.e. Polytetrafluoroethylene (PTFE). Preferably, the second material is elastomeric.

According to various embodiments of the present disclosure, the second polymeric material has a lower hardness than the first polymeric material, preferably less than 80% of the hardness of the first material.

According to various embodiments of the present disclosure, the working surface or at least one working surface corresponds to an inner face of the shell and the second polymeric material of which it is made comprises mainly silicone.

Advantageously, the shell is an annular band and the segments form portions of the band. Advantageously, the cross section of the segment and the shell are generally U-shaped with the arms of the U pointing towards the center of the shell. The hollow of the U thus forms a space for holding the abradable material.

According to various embodiments of the present disclosure, the working surface or at least one working surface mates with a lateral face of the shell and the second polymeric material of which it is made comprises mainly TEFLON®, i.e. Polytetrafluoroethylene (PTFE).

Advantageously, the lateral face is a front and/or rear face (depending on the direction of the fluid flow in the turbomachine). The lateral face can be annular and/or in a plane generally perpendicular to the turbomachine's axis of rotation.

According to yet other embodiments of the present disclosure, the working surface or at least one working surface is a surface that matches the stator blade's profile and the second polymeric material of which it is made is able to provide a tight fit with the blade, the second material preferably comprising silicone. In other words, the working surface corresponds to a bonding surface between the blade and the segment.

According to yet other embodiments of the present disclosure, the working surface has a transverse lipped profile that can deform when it contacts the blade while the shell is being assembled.

According to other embodiments of the present disclosure, the working surface or at least one working surface is a surface at one extremity of the segment along its arcuate profile, the surface matching that of a blade profile.

According to yet other embodiments of the present disclosure, the segment comprises at least one aperture for housing a stator vane in a generally radial direction, the working surface or at least one working surface being located in the aperture, face to face with the blade surface. In other words, the working surface corresponds to a bonding surface between the blade and the segment.

According to yet other embodiments of the present disclosure, the segment comprises a plurality of apertures distributed along the arcuate profile of the segment, each of the apertures being adapted to house a stator blade in a generally radial direction. The segment can comprise at least 3, preferably at least 4, more preferably at least 5 apertures.

The present disclosure also relates to a segmented stator blade shell of an axial turbomachine wherein the segments are in accordance with the invention. The shell can comprise at least 2, preferably at least 4, more preferably at least 8 segments.

The present disclosure also relates to a process for manufacturing a bladed stator shell segment of an axial turbomachine, wherein the segment is in accordance with the invention.

According to various embodiments of the present disclosure, the segment is moulded by injecting the first polymeric material and injecting the second polymeric material, the injection of the first and second materials being coordinated such that one of the first and second materials is still pasty when the other of the first and second materials is brought into contact with the material.

According to other embodiments of the present disclosure, the second material is injected after the first material.

According to yet other embodiments of the present disclosure, the segment is injection moulded in a constant volume mould.

According to yet other embodiments of the present disclosure, the segment is injection moulded in a variable volume mould, the variable part of the mould corresponding to the, or at least one, working surface.

The features of the invention enable several working surfaces to be formed directly on the shell during the moulding of the segments of which it is composed. Co-injection allows optimal cohesion between the material of the segment body and the material or materials of the working surfaces which is/are co-injected with the segment body.

Further areas of applicability of the present teachings will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

Corresponding reference numerals indicate corresponding parts throughout the several views of drawings.

DETAILED DESCRIPTION

The following description is merely exemplary in nature and is in no way intended to limit the present teachings, application, or uses. Throughout this specification, like reference numerals will be used to refer to like elements.

Figure 1:
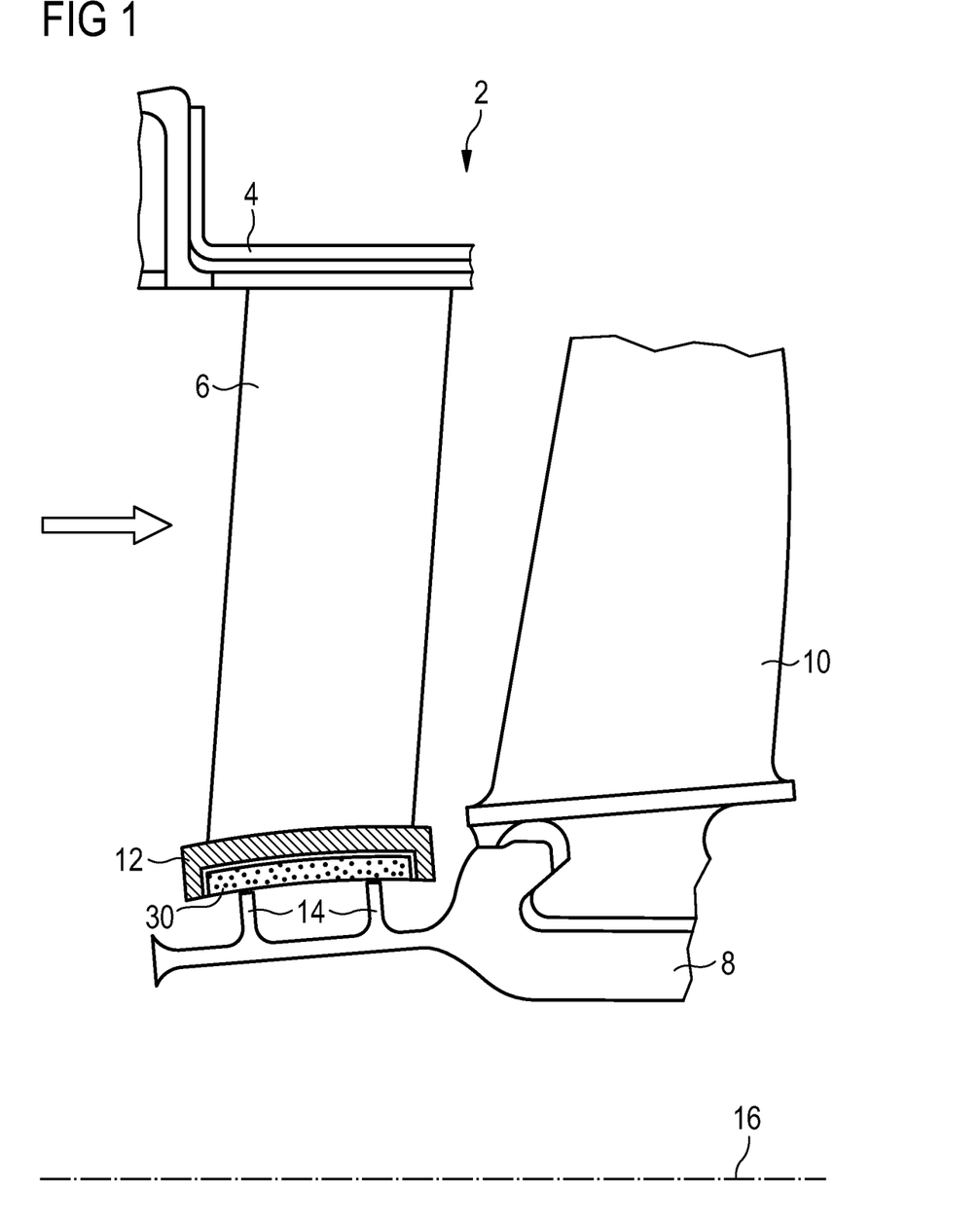
FIG. 1 is a partial sectional view of an axial compressor with, among other parts, an internal shell of the invention, in accordance with various embodiments of the present disclosure.

FIG. 1 illustrates a sectional view of a portion of an axial compressor 2, typically of a jet engine or turbine engine. The compressor 2 comprises a rotor 8 rotating about the axis 16. The rotor comprises a series of blades 10 fixed on its circumference, corresponding to a compressor stage. The direction of flow of the fluid to be compressed is shown by the arrow. A housing or compressor stator 4 has a series of blades 6 attached at their roots. This series of blades 6 comprises a stator in the fluid stream located between two rows of rotor blades 10, the upstream row not being shown. A row of rotor blades 10 and the downstream array of stator blades 6 comprise one compressor stage. The inner ends of the stator blades 6 are connected to a shell 12. The shell 12 is generally annular and matches the shape of the rotor 8. The shell 12 defines the lower or inner ring of the fluid stream passing through the stator 4. The shell 12 is held in place by the stator blades 6 and provides a seal with the rotor 8. The inner face of the shell 12 has a layer of abradable material 30. The rotor 8 comprises two circumferential ribs, more commonly referred to as lip seals 14 in contact with the abradable material layer 30. This layer 30 is applied and then machined so as to have a sealing surface in contact with the lip seals 14. This material 30 has frictional properties with the metal in the lip seals abradable material surface 11 thus constitute a labyrinth seal.

Figure 2:
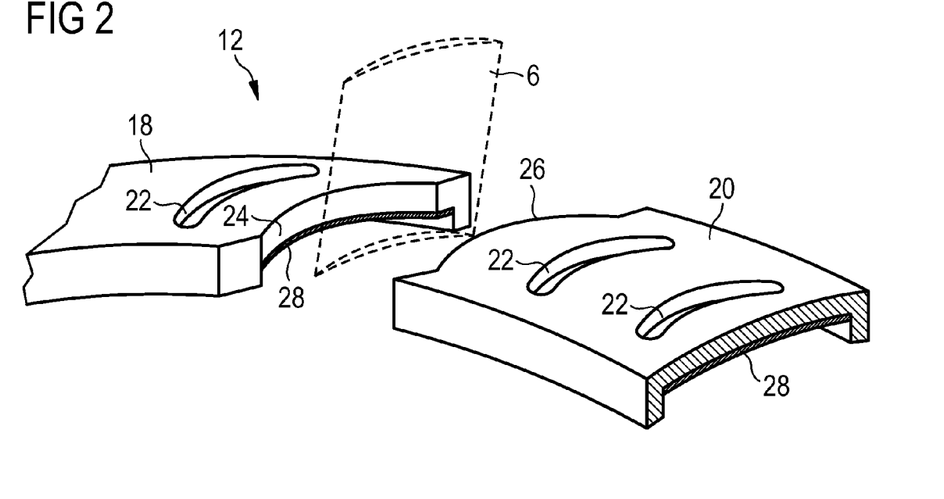
FIG. 2 is an isometric view of a part of the segmented shell of FIG. 1, in accordance with various embodiments of the present disclosure.

The construction and assembly of the shell 12 according to the various embodiments of the present disclosure is exemplarily illustrated in FIG. 2. The shell 12 is composed of several segments of which two, 18 and 20, are shown in FIG. 2. These segments 18 and 20 are all similar in principle and number two or more. The number of segments 18 and 20 can be freely selected based on different criteria such as the diameter of the shell 12 to be constructed, the material to be used and the number of blades 6 on the stator 4. The cross section of the segment 18 and 20 is generally in the form of an inverted "U". It comprises a generally flat base although profiled from an aerodynamic standpoint, the flat part forming a circular band when the shell 12 is formed by assembling all its segments 18 and 20. The shell 12 includes an upstream edge and a downstream edge relative to the direction of fluid flow. The width of the shell 12 from the upstream edge to the downstream edge is essentially constant. The segment cross section also has two short leg portions pointing downwards or towards the inside of the circular band formed by the base, each one being at one of the upstream and downstream edges. The short portions are at least approximately perpendicular to the flat portion and of generally constant height.

Each segment 18 and 20 has apertures 22 in the surface of the flat portion. These apertures 22 are distributed along the arc of the circle defined by the segments 18 and 22. The spacing between the apertures 22 is dictated by the position of the stator blades 6, the stator blades 6 being rigidly fixed to, or recessed in, the stator 4. Typically, each stator blade 6 has at its upper end a base platform, the platform then being positioned in a corresponding aperture of the stator 4 to be fixed by welding. Typically, the stator blades 6 are all identical and are spaced equally along the periphery of the stator 4 and the shell 12. Other arrangements are possible, however, and do not alter the principle of the present disclosure. The profile of the apertures 22 corresponds to the profile of the stator blades 6 in the shell 12, that is to say at the lower ends of the blades 6. A certain tolerance is, however, allowed, enabling easy placement of the segments 18 and 20 on the blades 6. The shell segments 18 and 20 are sized such that the lower ends of the stator blades 6 can penetrate the apertures 22 during the assembly of the segments 18 and 20 to form the shell 12. Depending on the chosen design, the ends of the stator blades 6 can either be flush with the inner face of the flat portion of the segments 18 and 20 or slightly above so as to be project with respect to the inner face, the projection being no more than the upstream and downstream ends of the edges. The apertures 22 are more or less centered on the segments 18 and 20 relative to the axis of the machine, that is to say the distance measured along the axis of the machine between each end of the apertures 22 and the corresponding edges are substantially equal. The apertures 22 can be offset along the axis of the machine in relation to this central position, provided that the apertures 22 do not encroach on the legs of the upstream and downstream edges.

The end of the segment 18 is shaped so as to fit the blade 6 located at the joint between the segments 18 and 20. It is the same for the end of segment 20. In fact, the segments 18 and 20 each comprise a part 24 and 26, respectively, whose profile corresponds to that of the blade 6. The ends of the segments 18 and 20 also contain, in addition to the parts 24 and 26 matching the blade, junction areas on both sides of parts 24 and 26 whose profiles are such as to close the joint upstream and downstream of the blade 6. These junction areas upstream and downstream of the blade are rectilinear. The joint upstream of the blade (on the left in FIG. 2) is inclined relative to the edge of the shell and at an angle of about 45°.

The two short leg portions pointing downwards or towards the inside of the circular band formed by the base of the shell 12 make up, together with the inner face of the flat portion, a space or volume suitable for holding the shell assembly after the application of an abradable material in liquid or paste form.

The inner surface 28 of the band formed by the shell 12 is a working surface in so far as it is intended to serve as a bonding surface to which the abradable material is applied.

The inner surface 28 is comprised of a layer of a material other than that constituting the bodies of the segments 18 and 20 of the shell 12. More specifically, this layer 28 is made of a material comprising at least mainly silicone which is co-injected with the material constituting the respective segment 18 and 20 during the manufacture of the latter. The respective segment 18 and 20 is made of a polymer material, preferably a composite material comprising carbon and/or glass fibres and a polymeric binder. This can be thermosetting or thermoplastic. It provides the necessary hardness and rigidity to give the respective segment 18 and 20 the structural stability required by its function and is well known as such to a person skilled in the art. The abradable materials to be sprayed or moulded are mostly made of a silicone-aluminium base which can include, in addition, polymeric compounds acting as additives. The presence of a surface comprising at least partially and preferably predominantly of silicone makes it naturally chemically compatible with a silicone-based abradable coating.

Co-injection is a process for injecting multiple polymers of different types into the same mould. More specifically, co-injection allows optimum cohesion between the different materials making up the co-injected object as the different types of polymeric materials come into contact with each other in the mould when they are still at least partially pasty.

The hardness of the silicone is usually between 20° and 80° Shore A, whereas the segment material hardness is between 80° and 100° Shore A.

Figure 3:
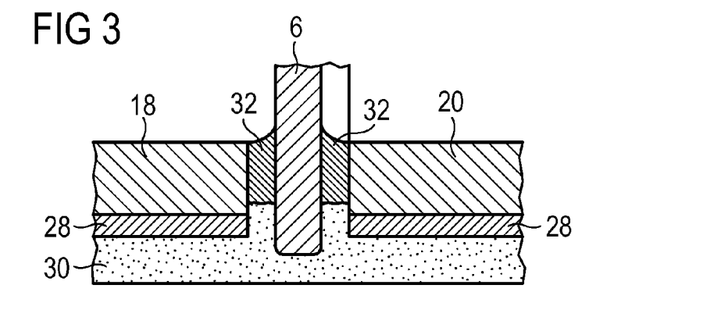
FIG. 3 is a sectional view of a portion of the shell of FIG. 1, at right angles to a blade, at the joint between two segments at one of the apertures distributed along a segment, in accordance with various embodiments of the present disclosure.

FIG. 3 is a sectional view of a portion of the shell 12 of FIG. 2 according to various embodiments of the disclosure. FIG. 3 is a section through the joint between the two segments 18 and 20. It should be noted that it could equally be a similar section through one of the apertures 22 of a segment 18 or 20. It can be seen that the stator blade 6 is secured and sealed to the shell 12 using joints or beads of elastomer applied manually. The silicone surface 28 on the inside face of the shell 12 serves as a bonding surface for the abradable material 30.

Figure 4:
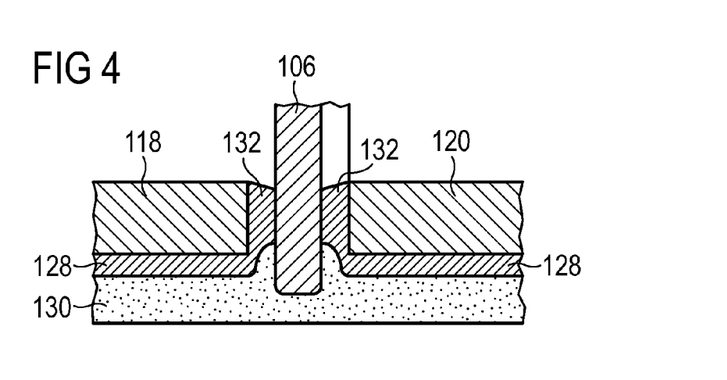
FIG. 4 is a section similar to that of FIG. 3, corresponding, in accordance with various other embodiments of the present disclosure.

FIG. 4 is a sectional view of a portion of the shell 12 which corresponds to that of FIG. 3. However, it illustrates other embodiments of the present disclosure where the surfaces adjoining the contoured surfaces of the stator blade 106 are also provided with a working surface like flexible lips 132, also co-injected with the constituent material of the shell segments 118 and 120. This surface avoids the need to manually apply elastomeric material to seal the stator blade 106 and the shell 12. In the case of FIG. 4, it should be noted that this working surface 132 is contiguous with the abradable material bonding working surface 128 on the inside of the shell 12. These working surfaces 132 and 128 need not be contiguous; they can indeed be made separately and also possibly in different materials.

As in FIG. 3, it should be noted that the illustration in FIG. 4 can likewise correspond to a section through one of the apertures 22 of the segments 118 and 120.

Figure 5:
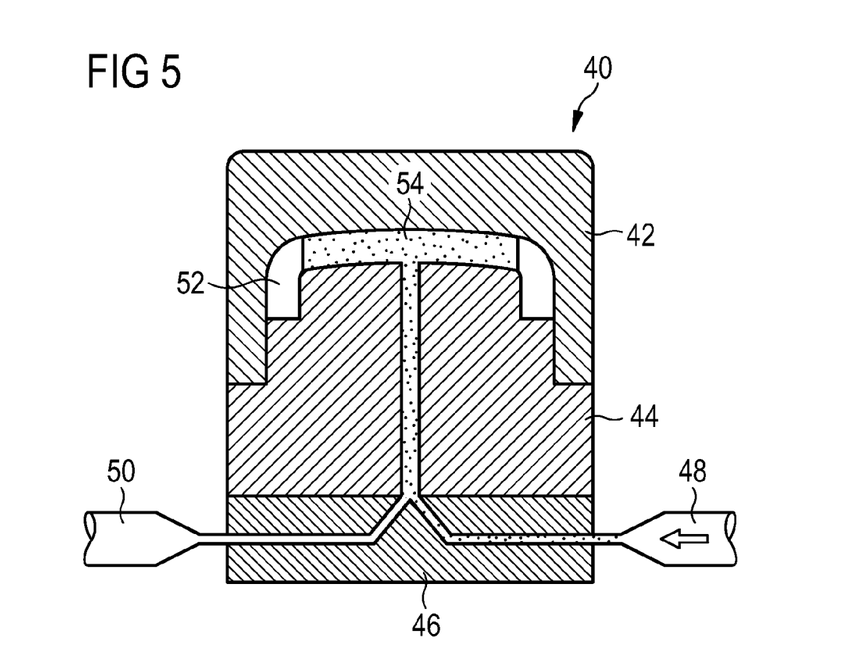
FIG. 5 is a sectional view of a mould during the first step of manufacturing a shell segment, in accordance with various embodiments of the present disclosure.
Figure 6:
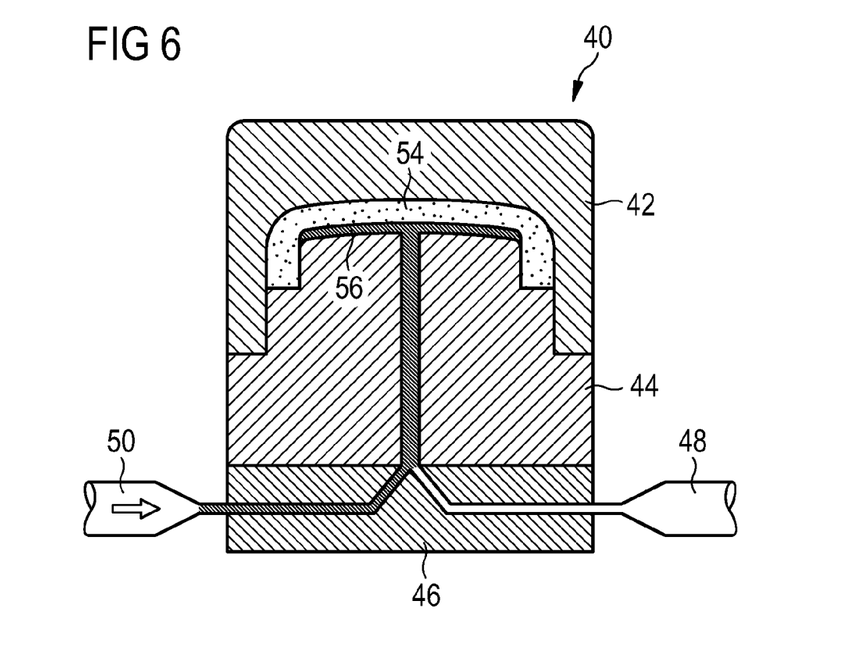
FIG. 6 is a sectional view of a mould during the second step of manufacturing a shell segment, in accordance with various embodiments of the present disclosure.

FIGS. 5 and 6 illustrate a first method of making a shell segment 18/118 and 20/120 according to the various embodiments of the disclosure. FIG. 5 illustrates a first step, while FIG. 6 illustrates a second step. The mould 40 comprises a first portion 42 and a second portion 44 together forming a cavity 52 whose shape corresponds substantially to that of the desired shell segments 18 and 20. The mould 40 also includes a base 46 for the feeding the raw materials to be injected. To the base 46 there are connected a first injector 48 for the segment 18/118 and 20/120 material 54, and a second injector 50 for the working surface 28/128 material 56.

In the first step illustrated in FIG. 5, the segment 18/180 and 20/120 material 54 is injected through the injector 48 into the mould 40 up to the point at which the cavity 52 is filled to a particular level.

In the second step, shown in FIG. 6, the material 56 to form the working surface 28/128 is injected through the injector 50 into the mould 40. This material 56 comes into contact with the first material 54, which is still pasty, and pushes it towards the ends of the cavity 52. The material 56 then fills a part of the cavity 52 centered on the inlet and bounded by the corresponding surface of the mould 40. The material 56 thus forms a layer on the underside of the first material 54.

It should be noted that the description in connection with FIGS. 5 and 6 has been intentionally simplified for clarity of presentation. Indeed, a person skilled in the art will recognize among other things that the mould 40 must have a geometry matching the arcuate segment and several raw material supply feeds may be required. Their layout and, in particular, their injection parameters can be obtained by state of the art development processes known to a person skilled in the art.

Figure 7:
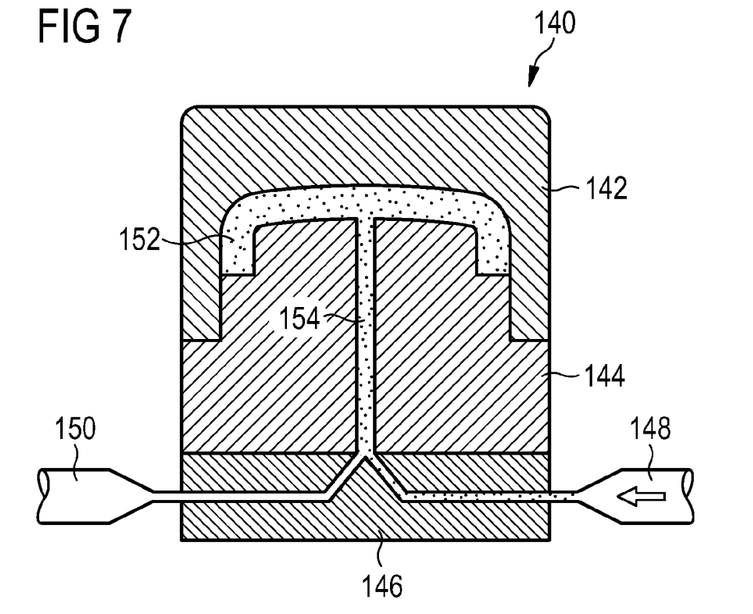
FIG. 7 is a sectional view of a mould during the first step of manufacturing a shell segment, in accordance with various other embodiments of the present disclosure.
Figure 8:
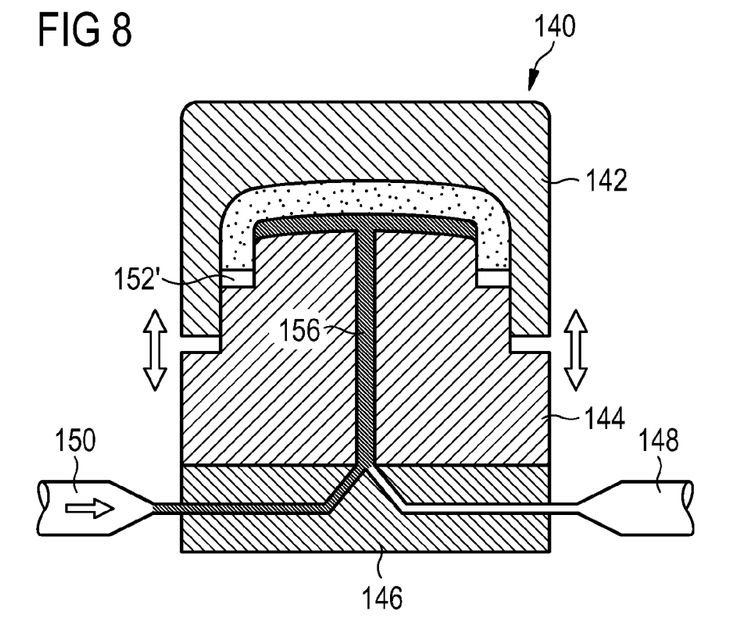
FIG. 8 is a sectional view of a mould during the second step of manufacturing a shell segment, in accordance with various other embodiments of the present disclosure.

FIGS. 7 and 8 illustrate a second method of making a shell segment according to various embodiments of the disclosure. FIG. 7 illustrates a first step, while FIG. 8 illustrates a second step. The mould 140 is largely similar to the mould 40 of FIGS. 5 and 6. It comprises a first portion 142 and second portion 144 together forming a variable volume cavity 152 whose shape corresponds substantially to that of the desired shell segments 18/118 and 20/120. The mould 140 also includes a base 146 for feeding the raw materials to be injected. To the base 146 there are connected a first injector 148 for the segment 18/118 and 20/120 material 154, and a second injector 150 for the working surface 28/128 material 156.

The variation in size of the cavity 152 is provided by the capability of the first and second portions 142 and 144 of the mould 140 to move relative to one another, the movement causing a change in the volume of the cavity 152. In the first step, shown in FIG. 7, the cavity 152 has a first volume corresponding more or less exactly to the volume of the structural portion of the respective segment 18/118 and 20/120, namely the portion of the respective segment 18/118 and 20/120 to be made of the first material 154. In the second step, shown in FIG. 8, the cavity 152 has changed, now having an increased volume, thereby freeing space on the underside of the respective segment 18/118 and 20/120 already partially formed in the first step. This space can be filled by the working surface material 156. Due to the chosen geometry, the material 156 will only fill this gap and thereby form a thin layer of this material 156, this thin layer being co-injected with the material 154 of the structural part of the respective segment 18/118 and 20/120. Just as in the fabrication example in FIGS. 5 and 6, when it is injected into the mould, the working surface material 156 comes into contact with the segment structure material 154 when it is still pasty or in a state to ensure molecular cohesion between the two materials 154 and 156.

In a similar way to that of the first embodiment of the segment fabrication described in relation to FIGS. 5 and 6, it should be noted that the description in connection with FIGS. 7 and 8 is also deliberately simplified for clarity.

Note also that the variable size of the mould cavity 152 for co-injecting the materials for the respective segment 18/118 and 20/120 itself and/or its working surface can be realized in different ways according to the principle described in connection with FIGS. 7 and 8. Instead of a translational movement of at least one part of the mould 140 with respect to the remainder, it is also conceivable to replace one part of the mould 140 forming part of the cavity 152 by another part of the mould 140 which will change the cavity 152 thus formed. This replacement can be achieved by some kind of rotational movement. This principle is known as such to a person skilled in the art.

Generally, it should be noted that one, or every, segment 18/118 and 20/120 of the shell 12 can comprise several working surfaces co-injected with the main material of the respective segment body. As has been described in connection with FIGS. 2, 3 and 4, these working surfaces can be located on the contact surfaces with the stator blades 6/106, as well as on the inner face of the respective segment. The material of each of these surfaces is thus chosen depending on the function of the surface. A front or rear side face of the shell 12 can also be a working surface. Such a face can be in contact with a corresponding stator surface. This may be the case particularly for the final stage of a low-pressure compressor where the rear face can, depending on the operating parameters of the engine, be in frictional contact with a corresponding annular surface as part of the housing. In this case, it is advantageous to make this working surface of a material compatible with dry friction, such as TEFLON®, i.e. Polytetrafluoroethylene (PTFE), which is co-injected with the structural material of the segments, in a similar way to that described above.

The description herein is merely exemplary in nature and, thus, variations that do not depart from the gist of that which is described are intended to be within the scope of the teachings. Such variations are not to be regarded as a departure from the spirit and scope of the teachings.

What is claimed is:

1. A method of manufacturing a segmented stator blade shell of an axial turbomachine, wherein the method comprises:
    injecting a first polymeric material with a second polymeric elastomeric material into a mould to mould a segment such that the segment comprises:
        a body with a generally arcuate profile and made of the first polymeric material; and
        at least one working surface on the body made of the second polymeric elastomeric material injected with the first material; and
    coordinating the injection of the first and second materials such that one of the first and second materials is still pasty when the other of the first and second materials is brought into contact with the material.

2. The method according to claim 1, wherein the second material is injected after the first material.

3. The method according to claim 1, wherein the segment is moulded by injection in the mould with a constant size cavity.

4. The method according to claim 1 wherein the segment is moulded by injection in the mould with variable volume cavity, the variable part of the mould corresponding to the least one working surface.

5. The method according to claim 1, wherein the second polymeric material has a lower hardness then the first polymeric material.

6. The method according to claim 5, wherein the hardness of the second polymeric material is lower than 80% of the hardness of the first polymeric material.

7. The method according to claim 1, wherein the at least one working surface corresponds to an inner face of the shell and the second polymeric material of which it is made comprises predominantly silicone.

8. The method according to claim 1, wherein the at least one working surface corresponds to a lateral face of the shell and the second polymeric material of which it is made comprises predominantly polytetrafluoroethylene.

9. The method according to claim 1, wherein the at least one working surface is a surface structured to fit the profile of a stator blade and the second polymeric material of which it is made is capable of ensuring a seal with the stator blade, the second material comprises silicone.

10. The method according to claim 9 wherein the at least one working surface has a transverse lipped profile that can deform when in contact with the stator blade when being mounted on the shell.

11. The method according to claim 1, wherein the at least one working surface is a surface at one extremity of the segment along its arcuate profile, the surface corresponding to a blade profile.

12. The method according to claim 1, wherein the segment comprises at least one aperture structured to house a stator blade in a generally radial direction, the at least one working surface being located in the aperture with respect to the surface of the stator blade.

13. The method according to claim 1, wherein the segment comprises a plurality of apertures distributed along an arcuate profile of said segment, each of the apertures structured to house a stator blade in a generally radial direction.

\* \* \* \* \*

UNITED STATES PATENT AND TRADEMARK OFFICE
CERTIFICATE OF CORRECTION

PATENT NO. : 9,644,486 B2
APPLICATION NO. : 13/658981
DATED : May 9, 2017
INVENTOR(S) : Christine Brassine and Xavier Wery Page 1 of 1

It is certified that error appears in the above-identified patent and that said Letters Patent is hereby corrected as shown below:

On the Title Page

At (73) Assignee: replace "Techspace Aero S.A. (BE)" with --Safran Aero Boosters SA (BE)--

Signed and Sealed this
Thirtieth Day of October, 2018

Andrei Iancu
*Director of the United States Patent and Trademark Office*